June 21, 1932. C. T. MORSE ET AL 1,863,576
APPARATUS AND METHOD OF AIR CONDITIONING
Filed Nov. 22, 1929  2 Sheets-Sheet 1
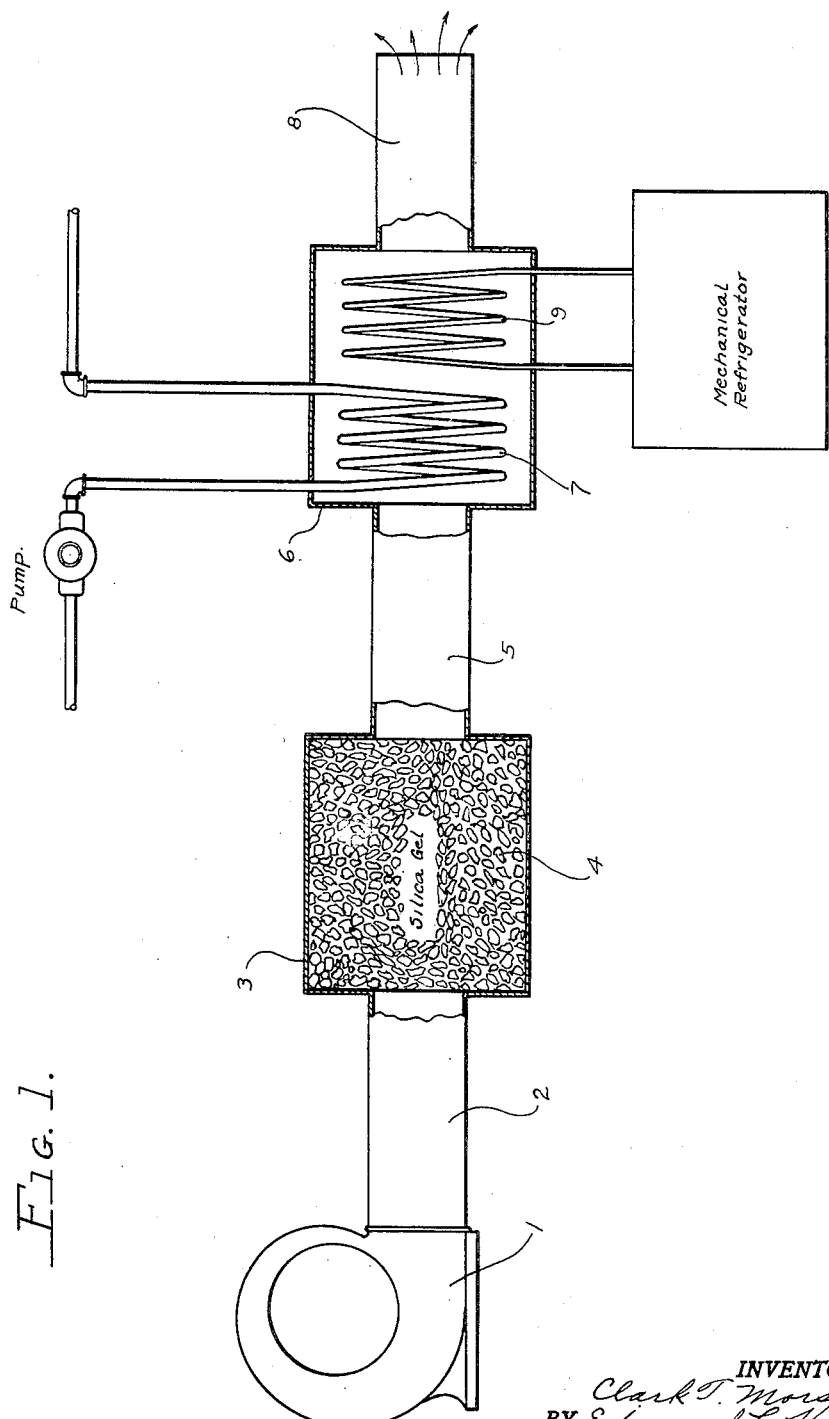

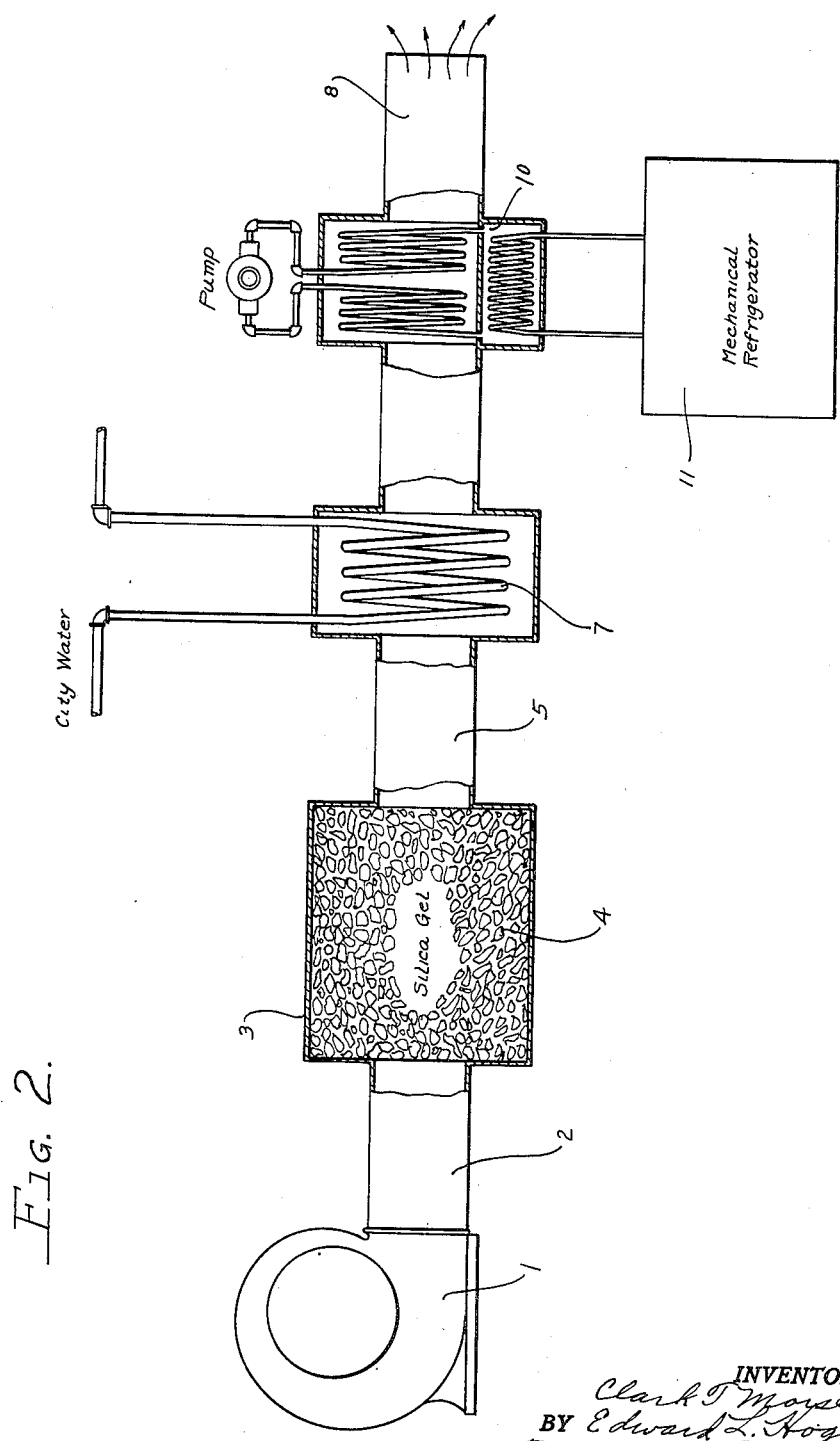

Patented June 21, 1932

1,863,576

UNITED STATES PATENT OFFICE

CLARK T. MORSE AND EDWARD L. HOGAN, OF DETROIT, MICHIGAN, ASSIGNORS TO AMERICAN BLOWER CORPORATION, OF DETROIT, MICHIGAN, A CORPORATION OF DELAWARE

APPARATUS AND METHOD OF AIR CONDITIONING

Application filed November 22, 1929. Serial No. 408,953.

Our invention relates to a method and apparatus for adjusting the dew point and for reducing the temperature of air to thereby condition air.

It is the object of our invention to provide means for reducing the dew point and means for reducing the temperature, and a method of treating air with such means in such a manner that the reduction of dew point will be by the most efficient method and apparatus and the reduction of temperature to lower the sensible heat of the air will likewise be accomplished by the most efficient portion of the apparatus and most efficient method.

It is a further object of our invention to reduce the dew point irrespective of the corresponding rise in temperature and to independently secure the sensible cooling desired irrespective of the dew point and without re-incorporating water with the low dew point air.

It is a further object of our invention to pass the incoming air through a de-hydrating agent, such as silica gel, to secure the dew point desired and then to reduce the temperature of the low dew point air to secure sensible cooling by mechanical refrigeration either, with or without water cooling, but in such a manner that the low dew point air is not brought in contact directly with water for its cooling and, therefore, is prevented from reabsorbing a material amount of moisture.

It is our object to provide a method of reducing dew point and raising temperature and then lowering the temperature while maintaining the dew point at substantially the same level thereby securing a resulting conditioned air of low dew point and adjusted, low sensible heat.

It is a further object to utilize the lowering of the sensible temperature by employing a natural cooling agent at ordinary temperature, such as water in coils, and to secure the refinement of adjusted temperature by mechanical refrigeration either separately from or in combination with the gross cooling by water coils.

Referring to the drawings, Figure 1 shows a diagrammatic layout showing a single stage of cooling with mechanical refrigeration control;

Figure 2 is a diagrammatic layout showing the utilization of a coarse adjustment of temperature by a water coil cooling and a fine adjustment of temperature by mechanical refrigeration.

Referring to the drawings in detail, 1 indicates a source of air to be conditioned, which passes through the pipe 2 and through a container 3 containing silica gel 4. The silica gel dehumidifies the air reducing it to a low dew point but, at the same time in the process of dehumidification the temperature of the air is raised so that it makes its exit into the exit line 5 as air having a very low dew point and a relatively high temperature. It then passes through the container 6 having water coils 7 and thence out through the pipe 8 to the point of use. This application of the air to the water-cooled coils reduces the sensible temperature without incorporating any further moisture into the air so that the result of a low dew point and a low temperature is accomplished while using the most efficient method of producing dew point irrespective of temperature and the most efficient method of reducing the temperature without affecting the dew point.

In other words, it is our object to provide means as a part of the apparatus for the accomplishment of our method of reducing dew point by dehumidification irrespective of temperature rise and of then reducing sensible temperature without disturbing the dew point condition of the air. Consequently, the most efficient apparatus can be employed for each of these stages without endeavoring to compromise the efficiency of the apparatus by doing more than one thing at a time.

In addition to the foregoing, after the gross cooling has been performed by water at ordinary temperatures passing through the coil 7, mechanical refrigeration coils 9 are employed for securing a lower temperature after pre-cooling has been accomplished through the gross cooling of water which can be used in large quantities very cheaply in ordinary water cooled coils thereby reducing the expense of mechanical refrigeration to the minimum and only applying it to very dry air which has been pre-cooled. By applying the cooling and the refrigeration to the air having a low dew point at this stage, in our method it is possible to prevent a precipitation of moisture, and an accomplishment of the elimination of frost thereby increasing the efficiency of the refrigeration.

It will be seen in Figure 2 that this cooling can be done by stages, first using a water cooling coil 7 and thereafter using a refrigerated, water-cooled coil 10 which is cooled by the mechanical refrigeration 11 to secure a fine adjustment of temperature while the coil 7 secures the coarse adjustment of the temperature.

Thus, it is possible by this method to eliminate the use of water sprays and other apparatus by which air of low dew point and high temperature must be passed through a cooling medium, such as a water spray where its direct contact with the water in order to reduce its heat results in the re-absorption of moisture and the consequent raising of the dew point.

It is possible by our method to eliminate all apparatus for lowering temperature which raises the dew point. Thus, by our method, we dehumidify the air while raising the sensible temperature; we cool the dehumidified air without raising the dew point by the use of a cheap, gross cooling medium such as water in coils not in contact with the air, and then apply a small amount of mechanical refrigeration as the final treatment of the air to bring it to the exact temperature desired as mechanical refrigeration can be accurately controlled.

It will be understood that suitable apparatus is employed for re-conditioning the silica gel for further use after it has become water saturated but this forms no part of our invention. It will be further understood that we mention silica gel only as a typical material of hydroscopic character which conveniently dehumidifies the air.

It will be understood that any other material or apparatus may be used in our method without departing from our invention.

It will be understood that we desire to comprehend within our invention such modifications as may be necessary to adapt it to varying conditions and uses.

Having thus fully described our invention, what we claim as new and desire to secure by Letters Patent, is:—

1. In an apparatus for conditioning air, means forming an air passageway, a container in said passageway containing silica gel for removing at least a portion of the moisture in the air, and a second container in said passageway, said second container having water cooled coils for conducting water of known temperature and adapted to impart one stage of temperature to the air and refrigeration coils for conducting a refrigerant of known temperature content from an independent source than that of said coils first mentioned adapted to impart a second stage of temperature to the air, whereby the temperature of the air is reduced as desired without changing the moisture content of the air as it passes from the silica gel.

2. In an apparatus for conditioning air, an air passageway, means in said passageway to remove the moisture from the air, a water cooled pipe for conducting water of known temperature, located in said passageway for imparting one stage of temperature for cooling the air, and a refrigerant cooled pipe for conducting a refrigerant of known temperature content from an independent source than that of said pipe first mentioned, located in said passageway for imparting a second and lower stage of temperature to the air whereby the temperature of the air can be controlled without changing the moisture content of the air after the moisture has been removed therefrom.

In testimony whereof, we affix our signatures.

CLARK T. MORSE.
EDWARD L. HOGAN.